May 1, 1934.    W. H. BAILEY ET AL    1,956,941
MAGNETIC CHUCK
Filed Sept. 14, 1931    2 Sheets-Sheet 1
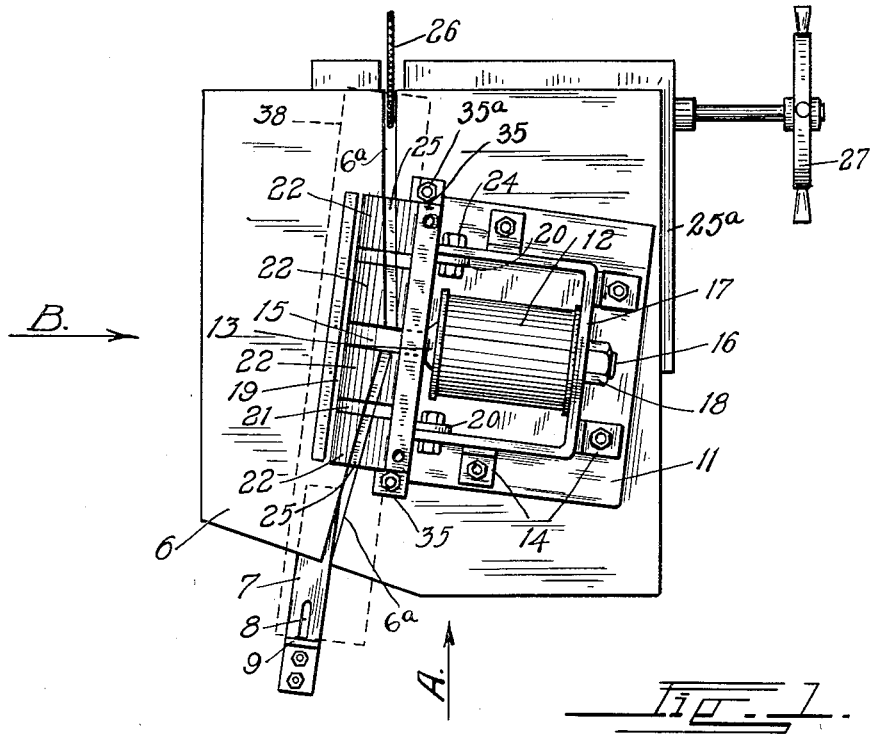
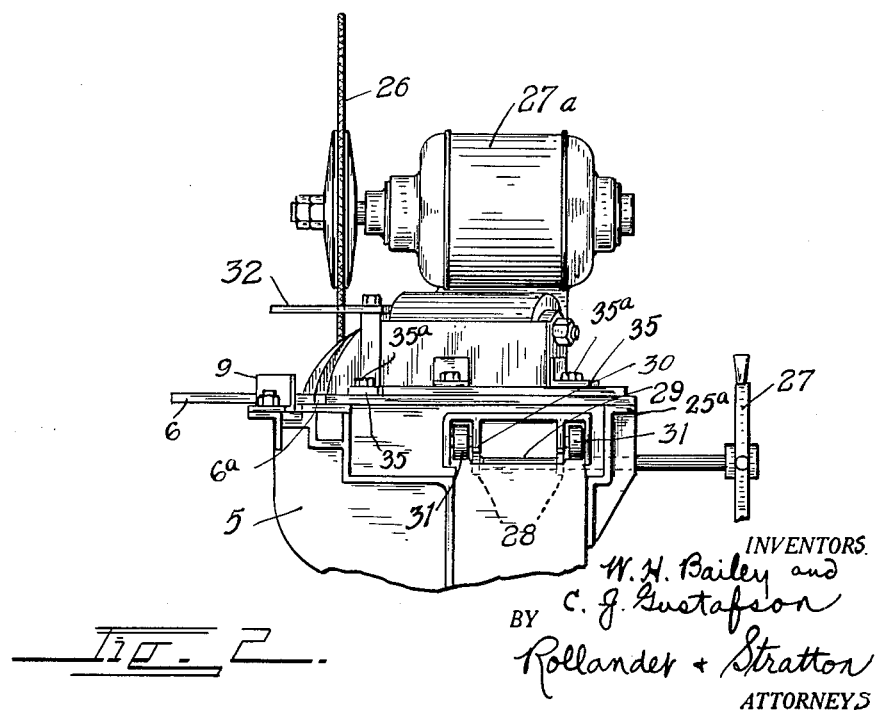
INVENTORS.
W. H. Bailey and
C. J. Gustafson
BY Rollander & Stratton
ATTORNEYS May 1, 1934.  W. H. BAILEY ET AL  1,956,941
MAGNETIC CHUCK
Filed Sept. 14, 1931   2 Sheets-Sheet 2

INVENTORS.
W. H. Bailey and
C. J. Gustafson
BY Rollander & Stratton
ATTORNEYS

Patented May 1, 1934

1,956,941

UNITED STATES PATENT OFFICE 1,956,941

MAGNETIC CHUCK

William H. Bailey and Carl J. Gustafson, Pueblo, Colo., assignors to The Colorado Fuel and Iron Company, Denver, Colo.

Application September 14, 1931, Serial No. 562,766

4 Claims. (Cl. 90—59)

Our invention relates to chucks, and particularly to chucks that will quickly release material held and which will grasp same with equal rapidity.

An object of the invention is to eliminate adjustment and the use of bolts and nuts that have heretofore been thought necessary to hold material in position in a chuck.

Another object is to provide a magnetic chuck of novel construction for holding material while being sawed.

Still other objects reside in details of construction and in novel combinations and arrangements of parts, which will appear in the course of the following description.

In the drawings, like reference characters designate similar parts in the several views.

Figure 1 is a plan view of an embodiment of my invention.

Figure 2 is an end elevation, looking in the direction of the arrow "A" of Figure 1.

Figure 3:
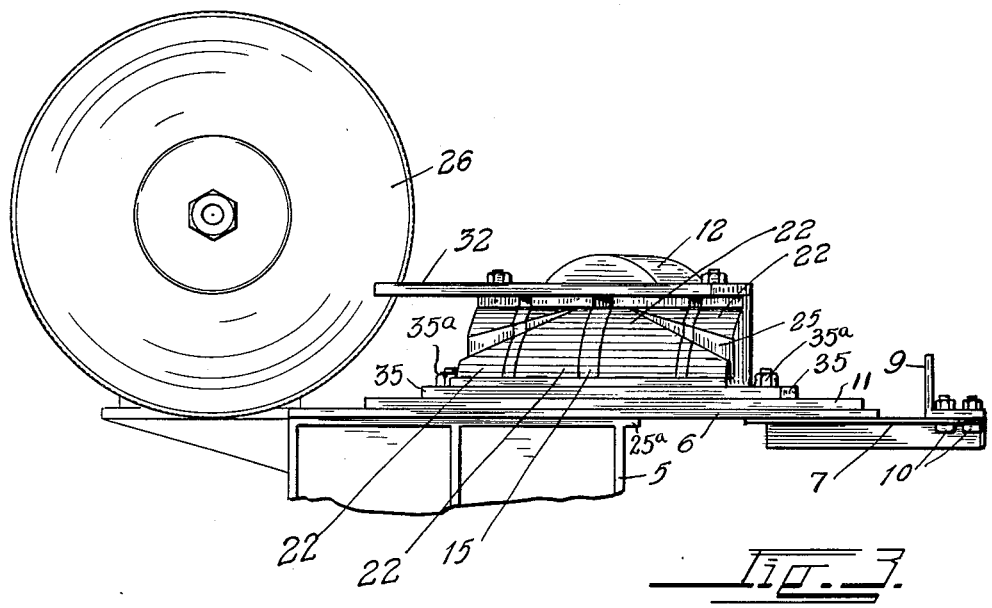
Figure 3 is a side elevation, looking in the direction of the arrow "B" of Figure 1.

Referring more in detail to the drawings, the reference character 5 designates a supporting structure. A plate 6 is mounted on the support. Fastened on the under-side of the plate by welding, or other suitable means is a bar 7 having a slot 8. A gauge 9 is movably mounted on the bar 7 and held in position by bolts 10 in the slot.

A non-conductive fiber mat 11 rests on the plate 6 and supports a solenoid 12 of conventional construction, and insulates same from the plate 6. The core for the solenoid has a nose member 13 fitting against a soft steel center section 15 of a chuck 19 (curved to conform with the material to be cut). The opposite end of the core is threaded as at 16 and projects through a horseshoe magnet 17, preferably of soft steel. A nut 18 clamps the horseshoe on the core member, and brackets 14 hold the horseshoe on the fiber mat 11.

The chuck has in addition to the soft steel section 15, two other sections 21 of similar material, the three sections being placed between blocks 22 of brass or other non-magnetic substance. The chuck is exteriorly curved to conform with the shape of articles to be cut, and the outer sections 22 have lugs 20 which are fastened to the ends of the horseshoe 17 by bolts 24. Lugs 35 and bolts 35a fasten the chuck upon the plate 6.

The chuck has slanting grooves 25 at its ends, for reception of a rotary saw 26 operated by an electric motor 27a. The grooves 25 each extend from one end to the center of the chuck where they meet at an obtuse angle. The purpose of the two grooves is to provide means for permitting the cut to be made from either end or first from one end and then from the other, the table 6 and chuck being changed in position from that shown in Fig. 1 until the lower groove 25 of that figure is alined with the saw 26. The plate 6 provides a carriage for the chuck, the solenoid and the magnet which through the intermediary of rollers 31 is movably mounted on the support 5. A rotary saw 26 on the support, is in practice, operated by an electric motor 27a and gears 28 on a shaft 29 rotating in bearings beneath a table 25a of the support mesh with racks on the underside of the carriage. A hand wheel 27 at an end of the shaft provides for its manual rotation. The plate 6 has slots 6a alined with one of the slanting slots 25 of the chuck, for movement of an article held on the chuck to engagement with the saw during movement of the carriage.

A saw guide 32 is fastened on the top of and overhangs the chuck. The guide 32 is slit at 33 to admit the saw. A cover 34 shown in Figures 2 to 4, encloses the solenoid.

In the wiring diagram, a source of electricity is indicated at 36 and a manual switch at 37. The motor and solenoid are also indicated in the wiring diagram.

Figure 4:
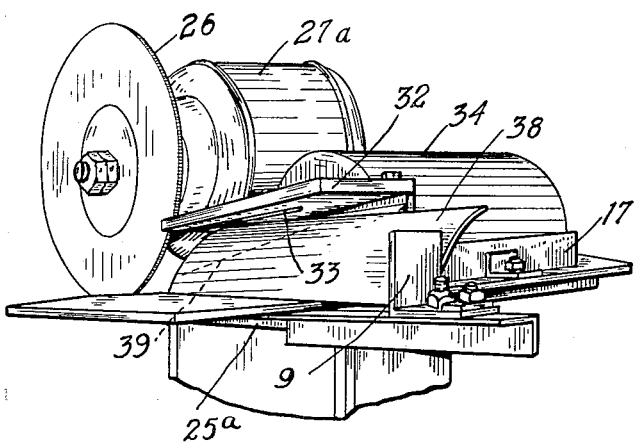
Figure 4 is a perspective view of the present chuck and an associated saw.
Figure 5:
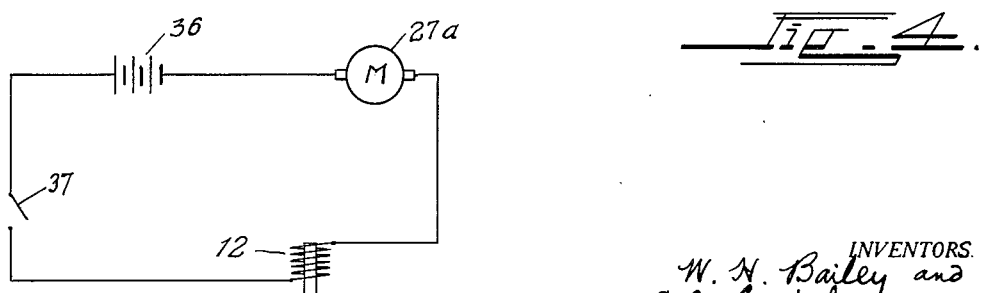
Figure 5 is a wiring diagram of the invention.

In the operation of the apparatus, material 38 to be sawed is indicated by dotted lines in Figure 1 and by full lines in Figure 4. The material or stock is placed in proper position against the gauge 9. The switch 37 is then closed, which energizes the solenoid and thereby magnetizes its core and the horseshoe fastened thereto. In this manner the soft steel sections of the chuck are effectively magnetized, which holds the material in position.

The saw is being rotated, since the switch 37 also closed the circuit of its motor. The carriage for the chuck is then advanced by means of the hand-wheel 27, whereby the saw cuts the material as indicated by dotted lines 39 in Figure 4. The carriage is then withdrawn and the switch 37 opened. The stock or material can then be lifted from the chuck and another piece put in position thereon.

It is to be understood that changes may be made in the construction, operation and arrangement of parts, without departing from the spirit and scope of the invention.

What we claim and desire to secure by Letters Patent is:

1. In an electric chuck, a work supporting device including a base, a series of spaced magnetizable members supported on said base, work supports of non-magnetic material arranged alternately with said magnetizable members, said supports having slots extending from their upper parts downwardly to permit passage of a cutting tool, said members including a central member and a pair of other members spaced oppositely from the central member, an electro-magnet extending laterally of said device at the center thereof and having a core one end of which is magnetically connected to said central member, and a horse-shoe magnet of soft iron having its center magnetically connected to the remaining end of said core, the terminals of the horse-shoe magnet being magnetically connected to said other members.

2. In an electric chuck, a work supporting device including a base, a series of spaced magnetizable members supported on said base, work supports of non-magnetic material arranged alternately with said magnetizable members and having curved work supporting surfaces forming spaced sections of the segment of a cylinder, said supports having slots extending from their upper parts downwardly to permit passage of a cutting tool, said members including a central member and a pair of other members spaced oppositely from the central member, an electro-magnet extending laterally of said device at the center thereof and having a core one end of which is magnetically connected to said central member, and a horse-shoe magnet of soft iron having its center magnetically connected to the remaining end of said core, the terminals of the horse-shoe magnet being magnetically connected to said other members.

3. In an electric chuck, a work supporting device including a base, a series of spaced magnetizable members supported on said base, work supports on non-magnetic material arranged alternately with said magnetizable members, said supports having slots extending from their upper parts downwardly to permit passage of a cutting tool, said members including a central member and a pair of other members spaced oppositely from said central member, an electro-magnet extending laterally of said device at the center thereof and having a core one end of which is magnetically connected to said central member, and a horse-shoe magnet of soft iron having its center magnetically connected to the remaining end of said core, said other members having lugs bolted to the ends of the horse-shoe magnet.

4. In an electric chuck, a work supporting device including a base, a series of spaced magnetizable members supported on said base, work supports of non-magnetic material arranged alternately with said magnetizable members and having curved work supporting surfaces forming spaced sections of the segment of a cylinder, said supports having slots extending from their upper parts downwardly to permit passage of a cutting tool, said members including a central member and a pair of other members spaced oppositely from said central member, an electro-magnet extending laterally of said device at the center thereof and having a core one end of which is magnetically connected to said central member, and a horse-shoe magnet of soft iron having its center magnetically connected to the remaining end of said core, said other members having lugs bolted to the ends of the horse-shoe magnet.

WILLIAM H. BAILEY.
CARL J. GUSTAFSON.